United States Patent
Cox et al.

(10) Patent No.: US 8,825,478 B2
(45) Date of Patent: Sep. 2, 2014

(54) REAL TIME GENERATION OF AUDIO CONTENT SUMMARIES

(75) Inventors: Susan Marie Cox, Rochester, MN (US); Janani Janakiraman, Austin, TX (US); Fang Lu, Billerica, MA (US); Loulwa F Salem, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 232 days.

(21) Appl. No.: 12/987,541

(22) Filed: Jan. 10, 2011

(65) Prior Publication Data

US 2012/0179465 A1    Jul. 12, 2012

(51) Int. Cl.
*G10L 15/26* (2006.01)
*G10L 15/06* (2013.01)
*G10L 17/00* (2013.01)
*G10L 15/00* (2013.01)
*G10L 21/00* (2013.01)
*G10L 21/06* (2013.01)
*G10L 11/06* (2006.01)

(52) U.S. Cl.
USPC ........... 704/235; 704/208; 704/210; 704/214; 704/215; 704/231; 704/243; 704/246; 704/257; 704/270; 704/270.1; 704/275; 704/276

(58) Field of Classification Search
USPC ......... 704/231, 235, 251, 208, 210, 214, 215, 704/243, 246, 257, 270, 270.1, 275, 276
See application file for complete search history.

(56) References Cited

U.S. PATENT DOCUMENTS

| | | | |
|---|---|---|---|
| 6,185,527 B1* | 2/2001 | Petkovic et al. | 704/231 |
| 6,449,342 B1* | 9/2002 | Johanson | 379/88.11 |
| 6,557,042 B1* | 4/2003 | He et al. | 709/231 |
| 6,714,909 B1* | 3/2004 | Gibbon et al. | 704/246 |
| 6,754,631 B1 | 6/2004 | Din | |
| 6,895,257 B2* | 5/2005 | Boman et al. | 455/556.1 |
| 7,007,235 B1* | 2/2006 | Hussein et al. | 715/751 |
| 7,035,804 B2 | 4/2006 | Saindon et al. | |
| 7,466,334 B1* | 12/2008 | Baba | 348/14.06 |
| 7,522,967 B2* | 4/2009 | Zhang et al. | 700/94 |

(Continued)

OTHER PUBLICATIONS

McNaught et al (hereinafter McNaught) "Using Wordle as a Supplementary Research Tool", The Qualitative Report vol. 15 No. 3 May 2010 630-643.*

(Continued)

*Primary Examiner* — Edgar Guerra-Erazo
(74) *Attorney, Agent, or Firm* — Hamilton, Brook, Smith & Reynolds, P.C.

(57) ABSTRACT

Audio content is converted to text using speech recognition software. The text is then associated with a distinct voice or a generic placeholder label if no distinction can be made. From the text and voice information, a word cloud is generated based on key words and key speakers. A visualization of the cloud displays as it is being created. Words grow in size in relation to their dominance. When it is determined that the predominant words or speakers have changed, the word cloud is complete. That word cloud continues to be displayed statically and a new word cloud display begins based upon a new set of predominant words or a new predominant speaker or set of speakers. This process may continue until the meeting is concluded. At the end of the meeting, the completed visualization may be saved to a storage device, sent to selected individuals, removed, or any combination of the preceding.

21 Claims, 6 Drawing Sheets

(56) References Cited

U.S. PATENT DOCUMENTS

| | | | |
|---|---|---|---|
| 8,019,069 B1* | 9/2011 | Cyriac et al. | 379/202.01 |
| 8,035,162 B2* | 10/2011 | Woo et al. | 257/355 |
| 8,037,021 B2* | 10/2011 | Adler et al. | 707/610 |
| 8,131,552 B1* | 3/2012 | Gibbon et al. | 704/270 |
| 8,266,534 B2* | 9/2012 | Curtis et al. | 715/753 |
| 2003/0016945 A1* | 1/2003 | Nakamura | 386/46 |
| 2004/0078188 A1* | 4/2004 | Gibbon et al. | 704/1 |
| 2004/0186712 A1 | 9/2004 | Coles et al. | |
| 2007/0071206 A1* | 3/2007 | Gainsboro et al. | 379/168 |
| 2007/0106724 A1* | 5/2007 | Gorti et al. | 709/204 |
| 2007/0133437 A1 | 6/2007 | Wengrovitz et al. | |
| 2008/0005051 A1* | 1/2008 | Turner et al. | 706/20 |
| 2008/0249764 A1* | 10/2008 | Huang et al. | 704/9 |
| 2009/0112892 A1* | 4/2009 | Cardie et al. | 707/100 |
| 2009/0157709 A1 | 6/2009 | Kruger et al. | |
| 2009/0193011 A1* | 7/2009 | Blair-Goldensohn et al. | 707/5 |
| 2009/0193328 A1* | 7/2009 | Reis et al. | 715/231 |
| 2009/0276497 A1* | 11/2009 | Gupta | 709/206 |
| 2009/0319917 A1* | 12/2009 | Fuchs et al. | 715/753 |
| 2010/0031142 A1* | 2/2010 | Nagatomo | 715/254 |
| 2010/0070276 A1* | 3/2010 | Wasserblat et al. | 704/243 |
| 2011/0040562 A1* | 2/2011 | Doyle et al. | 704/251 |
| 2011/0167078 A1* | 7/2011 | Benjamin et al. | 707/769 |
| 2012/0087591 A1* | 4/2012 | Chan et al. | 382/218 |
| 2012/0179465 A1* | 7/2012 | Cox et al. | 704/235 |
| 2012/0327243 A1* | 12/2012 | Rezvani | 348/158 |

OTHER PUBLICATIONS

"Context Preserving Dynamic Word Cloud Visualization" Weiwei Cui IEEE Pacific Visualisation Symposium 2010, Mar. 2-5, Taipei, Taiwan.*

IBM, "OnDemand Meeting Minutes, Conference Call scripts and Recordings", IP.com No. IPCOM000179946D, Mar. 3, 2009.

IBM, "Method for providing contextual information about previous communications with specific individuals", IP.com No. IPCOM000191662D, Jan. 11, 2010.

Rianne Kaptein, Maarten Marx, and Jaap Kamps. "Who Said What to Whom? Capturing the Structure of Debates." Proceedings of the 32nd Annual International ACM SIGIR Conference on Research and Development in Information Retrieval: SIGIR '09. pp. 832-833. Boston, MA. Jul. 19-23, 2009.

Realtime Transcription, Inc. 2010. "Frequently Asked Questions." Last date accessed Dec. 28, 2010. <http://www.realtimetranscription.com/index.php?page=faqs#7>.

Jonathan Feinberg. Wordle. 2009. <http://www.wordle.net>.

IBM Research. "Human Language Technologies—Speaker Recognition." Date accessed Nov. 13, 2010. <http://www.research.ibm.com/hlt/html/speaker_recognition.html>.

Zeynep Inanoglu and Ron Caneel. "Emotive Alert: HMM-Based Emotion Detection in Voicemail Messages." MIT Media Lab Technical Report No. 585, Jan. 2005, appeared in Intelligent user Interfaces (IUI 05), 2005, San Diego, Calif., USA.

R. Cowie, E. Douglas-Cowie, N. Tsapatsoulis, G. Votsis, S. Kollias, W. Fellenz, and J. G. Taylor. "Emotion Recognition in Human-Computer Interaction." IEEE Signal Processing Magazine, Jan. 2001.

P. J. Durston, M. Farrell, D. Attwater, J. Allen, H.-K. J. Kuo, M. Afify, E. Fosler-Lussier, and C.-H. Lee. "Oasis Natural Language Call Steering Trial." In Proceedings Eurospeech. Aalborg, Denmark. 2001.

R. Fernandez. "A Computational Model for the Automatic Recognition of Affect in Speech." PhD thesis, MIT Media Lab, 2004.

* cited by examiner

REAL TIME GENERATION OF AUDIO CONTENT SUMMARIES

BACKGROUND

1. Field of the Invention

The disclosure relates generally to a computer implemented method, system, and computer program product for real time generation of audio content summaries, and more specifically to real time generation of audio content summaries by distinguishing between different subject matter and/or speakers within the audio content.

2. Description of the Related Art

A "word cloud" or "tag cloud" is commonly used to refer to a visualization of text in a "cloud" of text. A word cloud may display every distinct word of a whole document. Often, a word cloud will give greater prominence to words used more frequently. At a glance, one would be able to see what the "key words" (the most prominent) were in any particular document. Wordle™ by Jonathan Feinberg (http://www.wordle.com) is an application that generates word clouds with prominent key words. Other applications do not include every word, but will drop off non-important words ("and", "the", "a") or words that do not meet some defined threshold (percent, total word usage).

Word clouds have recently been used to summarize, in their fashion, the contents of a conversation. This provides a benefit to a late corner of a conversation, who would be able to glance at the word cloud and glean what the conversation has been about up to that point. It also may be beneficial for a participant to review the word cloud after the conversation if he wanted to refresh his memory.

Speech recognition software is known in the art. It allows for receiving spoken audio and converting the spoken audio to text. Commercially available products exist such as IBM's® ViaVoice® and Nuance Communication's™ Dragon Naturally Speaking™.

Speaker recognition software, also referred to as voice recognition software, is also known in the art. This differs from speech recognition because instead of determining what is being said, it allows the user to determine who is saying it. Within this document, the term "voice print" refers to data derived from processing speech of a given person, where the derived data may be considered indicative of characteristics of the vocal tract of the person speaking. A "distinct voice" generally refers to a distinct voice print.

There are several ways a voice print may be a matched with a previously stored voice print. The first way is that the voice print data can be thought of as a numerical vector derived from the reference speaker's voice. A second numerical vector can be derived in a like manner from the voice under test, and a numerical algorithm can be used to compare the two vectors in a way where the comparison produces a single number that has been found to be indicative of the likelihood of a correct match.

Since the absolute likelihood of a correct match is not independent of the voices of all the people who might be tested who are not a match, a more useful method compares the voice signature of the person being tested to voice signatures from a number of other individuals, or to an average voice signature derived from a number of people. The likelihood that the voice signature under test is the voice that was used to derive the reference voice signature is then derived from the extent to which the voice signature under test matches the reference voice signature better than it matches other individual voice signatures, or the extent to which the voice signature under test matches the reference voice signature better than it matches the "average" voice signature of the population.

A third way that voice recognition algorithms can be thought of as testing a given person's voice to see if it matches a previously stored voice print is that the stored voice print may be thought of as a model which is repeatedly tested against over time using small samples of the voice under test, and the resulting test scores are averaged over time. This procedure may be used with one of the above methods to produce a likelihood score which has more certainty the longer the speech under test is listened to. This variable sample length method may have advantages in live monitoring applications and in applications where it is desirable not to waste computational resources once a desired certainty level has been attained.

Voice prints may also include prosody measurements. The word prosody (defined at Princeton University as "the patterns of stress and intonation in a language") is often used in the field of affective computing (computing relating to emotion) to refer to emotion-indicating characteristics of speech. Prosody measurements may include detecting such speech characteristics as word rate within speech, perceived loudness, sadness, happiness, formality, excitement, calm, etc.

SUMMARY OF THE INVENTION

The different illustrative embodiments provide a method, a computer program product, and a computer system for visualizing content of a meeting having a plurality of segments. In an illustrative embodiment, a program will receive an input of audio content. For each segment of the plurality of segments the program will do certain tasks. The program marks a start point for the segment. The program converts the audio content to text using speech recognition software. The program generates a word cloud summarizing the text from within the segment. And the program identifies an end point for the segment.

DETAILED DESCRIPTION

Figure 1:
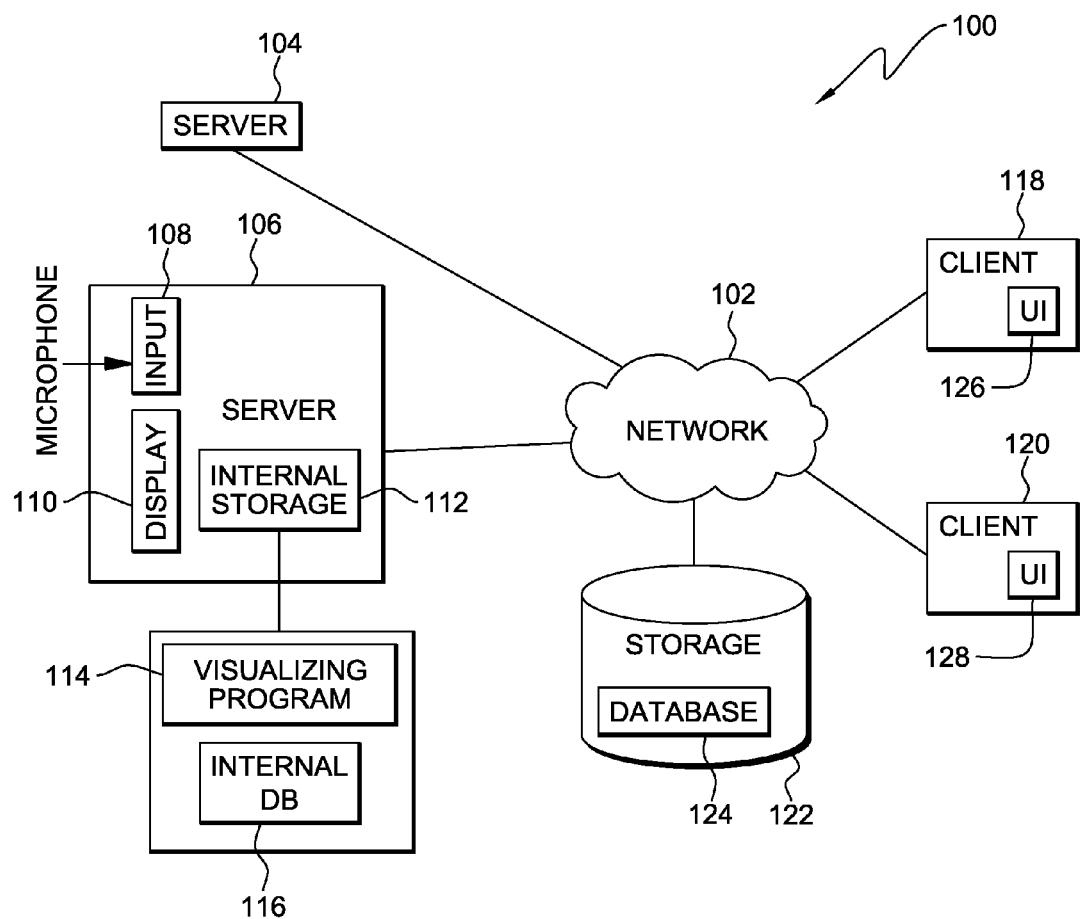
FIG. 1 is an illustration of a data processing environment depicted in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in any combination of one or more programming languages, including an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 122. Client computers 118 and 120 connect to network 102. Client computers 118 and 120 may be, for example, personal computers or network computers. In the depicted example, server computer 106 receives information from client computers 118 and 120 and from local input 108. Local input 108 can be, for example, audio or a document. Server computer 106 then provides information, such as data files and visual images to client computers 118 and 120 and local display 110. Client computers 118 and 120 are clients to server computer 106 in this example. Client computers 118 and 120 may contain user interfaces (UIs) 126 and 128 to process and display the data files and visual images. Network data processing system 100 may include additional server computers, client computers, displays and other devices not shown.

Program code located in network data processing system 100 may be stored on a computer recordable storage device and downloaded to a data processing system or other device for use. For example, program code, such as a visualizing program 114, may be stored on a computer recordable storage device such as internal storage 112 on server computer 106 and downloaded to client computer 118 over network 102 for use on client computer 118.

Data gathered and generated, as well as maintained for use by visualizing program 114 may be kept on server computer 106 in an internal database 116 or may be kept in database 124 within network storage 122.

In the depicted example, network data processing system 100 is the Internet with network 102 representing a worldwide collection of networks and gateways that use the Transmission Control Protocol/Internet Protocol suite of protocols to communicate with one another. At the heart of the Internet is a backbone of high-speed data communication lines between major nodes or host computers consisting of thousands of commercial, governmental, educational and other computer systems that route data and messages.

In these illustrative examples, client computer 118 may be a client data processing system that can receive data, such as a visual depiction, for example. The program code for use on client computer 118 may be a communication program for sending audio and receiving data files in return. Additionally, server computer 106 may be a server data processing system for transferring visual data in network 102. Server computer 106 may include agents for transferring visual data among client computers 118 and 120.

Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Figure 2:
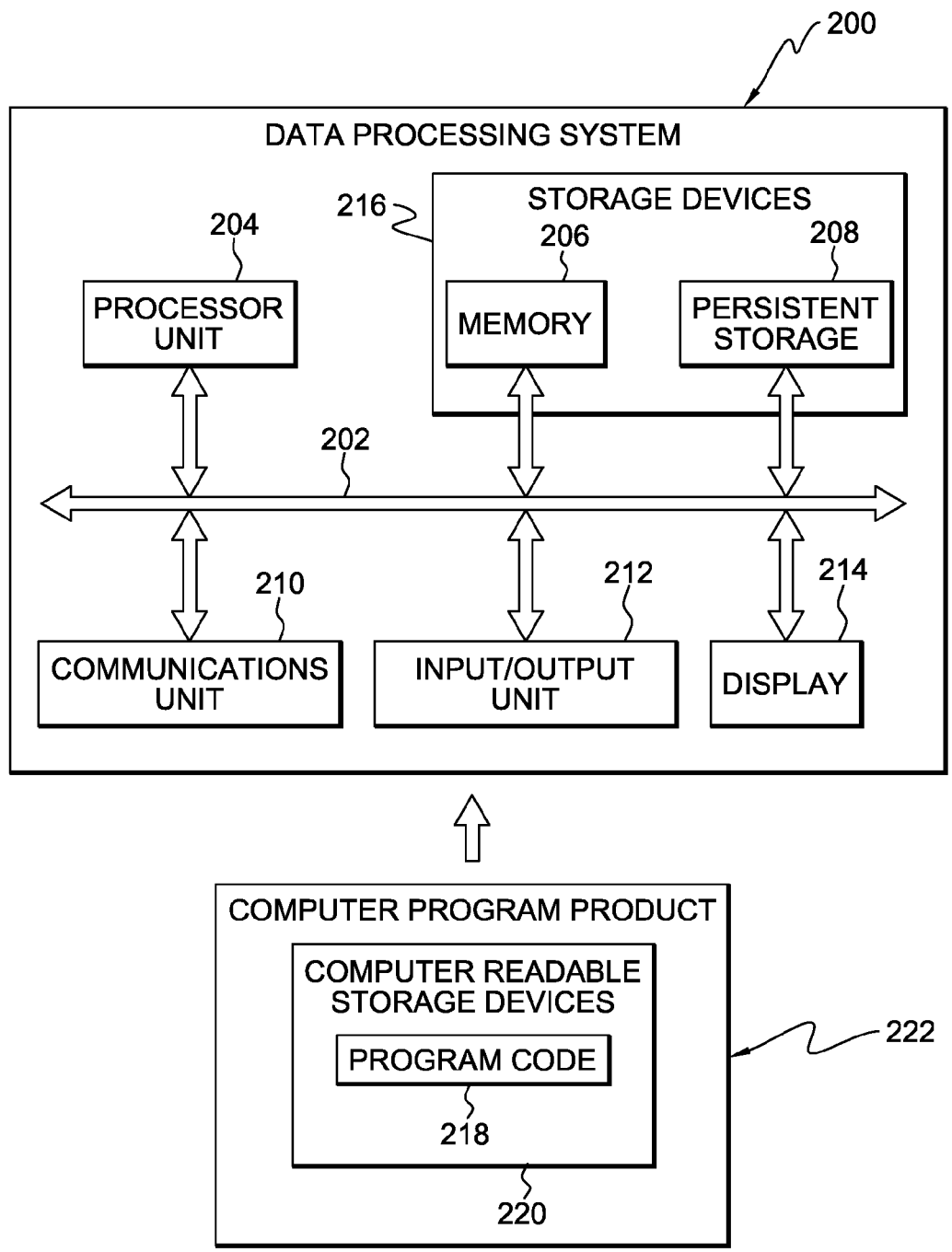
FIG. 2 is an illustration of a block diagram of a data processing system depicted in accordance with an illustrative embodiment.

Turning now to FIG. 2, a block diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, a microphone, and/or some other suitable input device. Further, input/output unit 212 may send output to a printer or to an external display. Display 214 provides a mechanism to display information to a user.

Instructions for an operating system, applications and/or programs may be located in storage devices 216, which are in communication with processor unit 204 through communications fabric 202. In these illustrative examples the instructions may be in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, program instructions, or computer readable program instructions that may be read and run by processor unit 204. The program code in the different embodiments may be embodied on different physical or tangible computer readable media, such as memory 206 or persistent storage 208.

Program code 218 is located in a functional form on computer readable storage devices 220 that is selectively removable and may be loaded onto or transferred to data processing system 200 for running by processor unit 204. Program code 218 may correspond to the visualizing program 114 on server 106. Program code 218 and computer readable storage devices 220 form computer program product 222 in these examples. Computer readable storage devices 220 may include, for example, internal storage 112, and may be an optical or magnetic disk that is inserted or placed into a drive or other device that is part of persistent storage 208 for transfer onto a storage device, such as a hard drive, that is part of persistent storage 208. Computer readable storage devices 220 also may take the form of a persistent storage, such as a hard drive, a thumb drive, or a flash memory, that is connected to data processing system 200. In some instances, computer readable storage devices 220 may not be removable from data processing system 200.

In some illustrative embodiments, program code 218 may be downloaded over a network, such as network 102, to persistent storage 208 from another device or data processing system via communications unit 210 for use within data processing system 200. For instance, program code stored in a computer readable storage device in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

Though in a preferred embodiment, the visual display of the client, such as a UI 126 or 128 on clients 118 and 120 respectively, will dynamically update as the server, such as server 106, receives audio from local input (108) and through a network (102), depending on several factors, time for visual data to be sent from a sender's computer, such as server 106, to being available at the recipient's computer, such as clients 118 and 120, may be longer than desired. For example, without limitation the factors may include the size of the visual data, the speed of the network connection, and/or an amount of traffic on the network.

In the course of inventing this method, computer program product, and computer system the inventors found that to produce a word cloud for a conversation, the conversation must have been in a text format—such as instant messaging. Furthermore, only one word cloud is produced for an entire conversation. Summarizing word clouds would have increased utility if they could be used with actual auditory conversations or meetings. In addition, a single word cloud for an entire conversation may grow too large and contain too many words for a discernable subject or topic to be made out. Yet should the number of words included in the word cloud decrease to a visually acceptable level, key words that were in fact important to the conversation may be left out. If a conversation or a meeting could be broken up into multiple segments by subjects and speakers, with word clouds assigned to each segment, a person would get a more coherent and in-depth understanding of the conversation or meeting, and still be able to do so "at a glance."

The inventors also discovered that though speech recognition software may produce an entire transcript of a conversation, such a transcript is cumbersome to read through—especially if the conversation or meeting was long. Similarly, converting a long transcript into a single word cloud would induce the above described deficiency.

Thus, the different illustrative embodiments provide a method, a computer program product, and a computer system for summarizing content of a meeting. In an illustrative embodiment, a server retrieves audio data from one or more clients and/or a local input device. The server uses speech and speaker recognition software to identify one or more speakers and convert audio to text. The text and speaker identities are converted into summarizing word clouds. The word clouds may be discarded, stored for later use, or depicted in a visual representation on a display device or client user interface.

As used herein, a set when referring to items means one or more items. Also as used herein, a first component may be considered to be associated with a second component by being secured to the second component, bonded to the second component, fastened to the second component, and/or connected to the second component in some other suitable manner. The first component also may be connected to the second component through using a third component. The first component may also be considered to be associated with the second component by being formed as part of and/or an extension of the second component.

Figure 3:
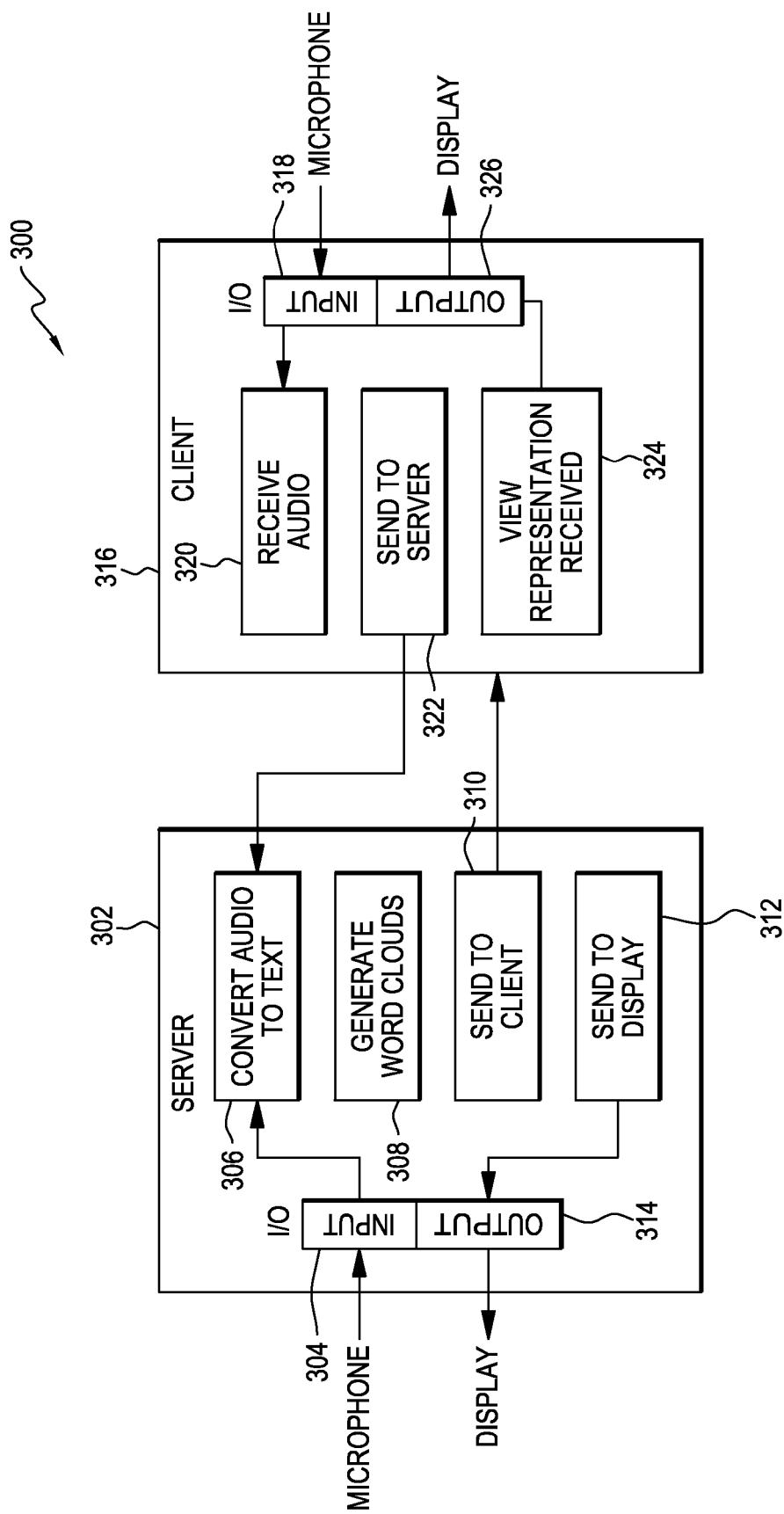
FIG. 3 is an illustration of a data flow block diagram of a server and client information transfer environment depicted in accordance with an illustrative embodiment.

FIG. 3 depicts an illustrative embodiment of a data flow block diagram of a server and client information transfer environment 300. In the client/server data transfer environment 300, there is a server 302 and a client 316. The server 302 may receive audio directly through input 304 such as a microphone. Similarly, though the server 302 may pick up audio from a user over a speaker phone or the like, the client 316 may also receive the audio locally 320 through a client input 318 and send to server 302 through a client process 322. The server 302 undertakes the process of converting audio to text 306. The server 302 will then generate a word cloud 308 based on the text. The server 302 may send the generated word cloud to the client 310 or to a local display 314 through process 312. A client user interface, as depicted in 126 and 128, may view any visual representation received on display 326 through process 324. Other similar data transfer embodiments exist.

Figure 4:
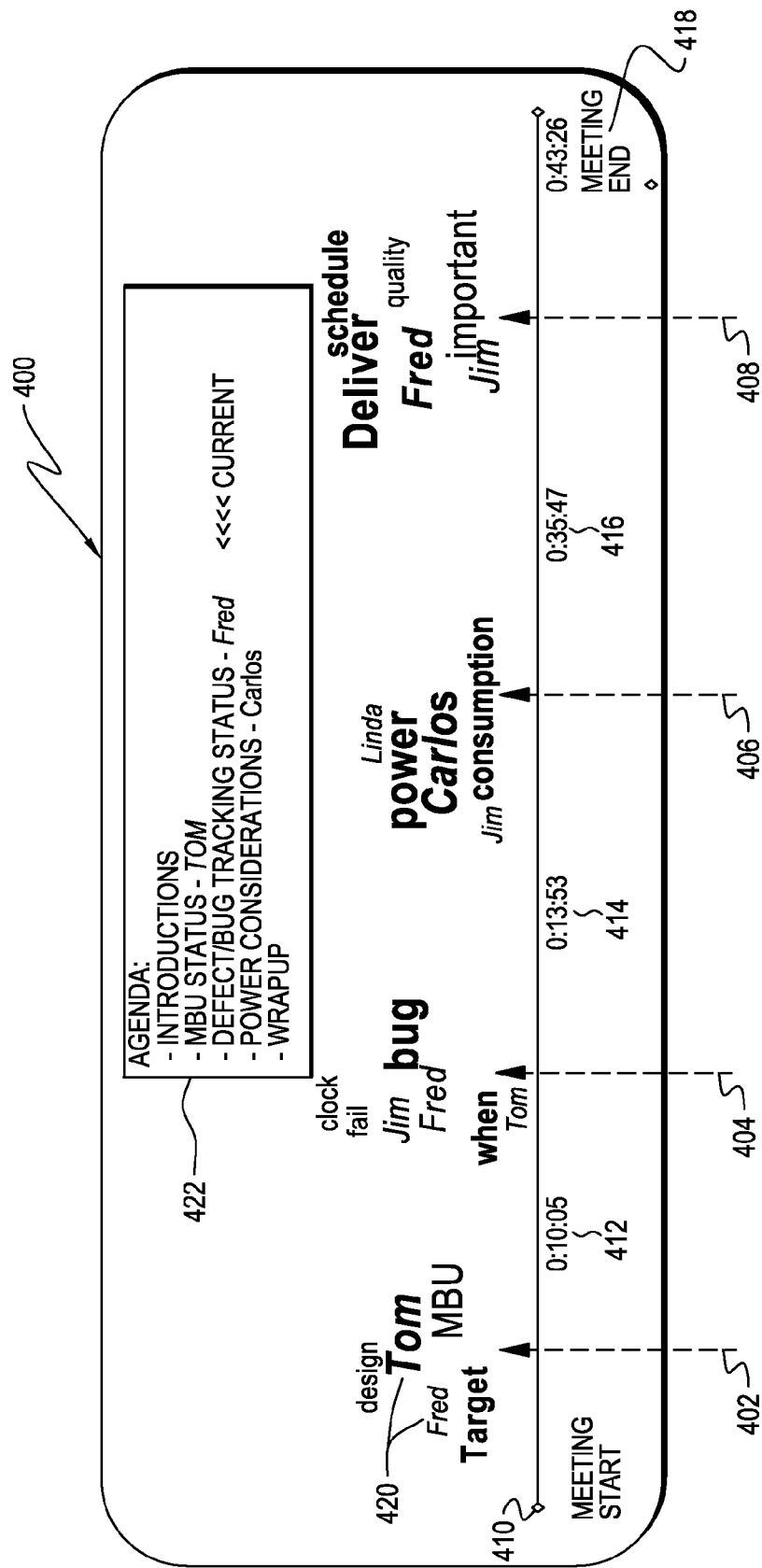
FIG. 4 is an illustration of a display of meeting content depicted in accordance with an illustrative embodiment.

With reference now to FIG. 4, an illustration of a display of meeting content is depicted in accordance with an illustrative embodiment. The term "meeting" is used not only in the technical sense of a gathering of more than one person, but also, in the context of the invention, may include a web cast involving only one presenter or a pre-recorded speech or lecture involving one person. While normally speeches, lectures, and the like are done in groups of more than one, with current technology such events may occur in isolation to be viewed at a later time, and the invention does include such activities. Nor do gatherings need to be physical, they can be accomplished through a computer network, phone lines, or any other medium capable of connecting two or more persons. A non-exhaustive list of such gatherings includes a physical conference, an e-conference, a phone-conference, a live internet face chat, a lecture, or any combination of the preceding.

As depicted, display 400, which is an example of a UI (such as 126 or 128 in FIG. 1) or a local display (such as 110 in FIG. 1), includes word clouds 402, 404, 406 and 408, as well as a timeline 410 and an agenda 422. Word clouds 402, 404, 406 and 408 are examples of one implementation of word clouds generated in FIG. 3. Display 400 presents an example of a visual representation of word clouds containing both key words and key speakers. Display 400 may be displayed on any display device, including but not limited to, a monitor, television, projection device, a window in a user interface, or any such device.

In this illustrative example, word cloud 402 includes both text words and speaker names 420. In this example, the words are displayed in varying sizes. Also in this example, the speaker names 420 are displayed in italics and also of varying sizes. In other embodiments, various colors or fonts may be used, names 420 and words may be of uniform or varying sizes and order and placing of the names 420 and words may vary. In another embodiment word cloud 402 may be comprised of only text words. In another embodiment word cloud 402 may be comprised of only speaker names 420. In yet another embodiment supplemental content (as will be defined and discussed in subsequent paragraphs) may be included with text words, or in another instance may be represented separately by font, color, or other various representation styles.

In these illustrative examples, timeline 410 presents markers 412, 414, 416, and 418 for start and stop points in meeting segments from which word clouds 402, 404, 406, and 408 are derived from. In this example, markers 412, 414, 416, and 418 use elapsed time from the start of the meeting. In other embodiments, markers may include, but are not limited to, mere visual breaks or actual time. In yet another embodiment, display 400 is devoid of the timeline 410.

Also in this illustrative example, an agenda 422 is displayed at the top of the visualization. The agenda 422 includes pre-entered subjects and/or speakers for the meeting, highlighting which subject and/or speaker is current at any point during the presentation. Different representations and techniques for displaying an agenda may be used.

The illustration of display 400 is not meant to imply physical or architectural limitations to the manner in which different features may be implemented. Other components in addition to and/or in place of the ones illustrated may be used. Some components may be unnecessary in some illustrative embodiments.

Figure 5:
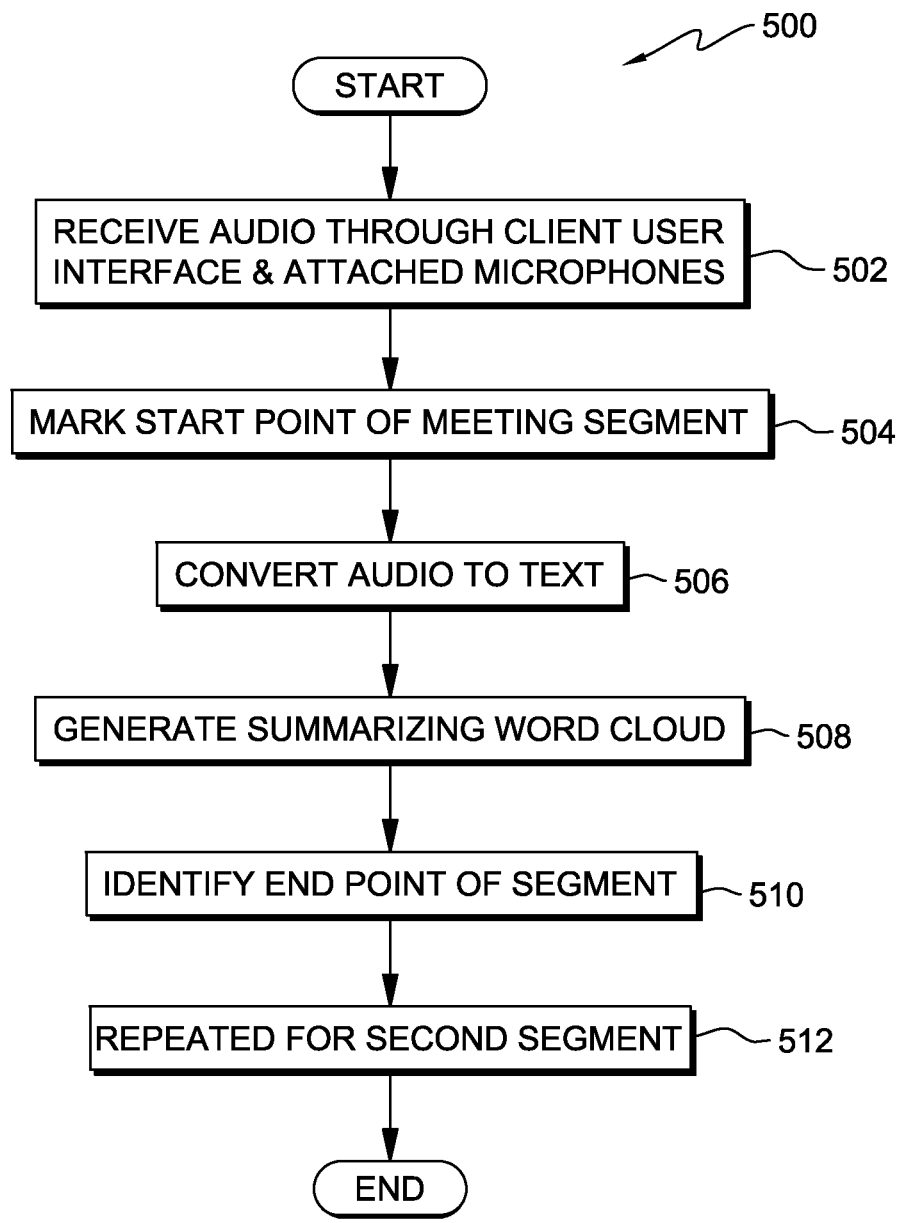
FIG. 5 is a flowchart of a process of generating word clouds based on word content depicted in accordance with an illustrative embodiment.

With reference now to FIG. 5, a flowchart of a process for generating word clouds based on word content is depicted in accordance with an illustrative embodiment and represents one implementation of visualizing program 114 of FIG. 1.

Visualizing program 500 begins by receiving audio content through attached input devices, through a network, or through a combination of both (block 502). Input devices include, but are not limited to, microphones and similar technology. Regarding receiving audio content through a network, in one embodiment of the invention audio content may be recorded at a client, e.g. client 118 of FIG. 1, and sent through a network to a server, e.g. server 106 of FIG. 1, as the digital representation of such content. Audio content may consist of any sort of words, slang, jargon, proper names, or verbal communication spoken aloud. Receiving audio content 502 will continue throughout the meeting.

Visualizing program 500 marks a start pointing of a segment of the meeting (block 504). A segment of the meeting is merely a portion of the meeting. A first marker will coincide with the start of visualizing program 500. Subsequent starting points will be located by identifying an end point to the current segment (block 510).

Visualizing program 500 can convert the audio content into text (block 506) using speech recognition software. Text may be kept in temporary or permanent storage.

Visualizing program 500 will use the text to generate a summarizing word cloud 508. A word cloud, as described in the background and depicted in blocks 402, 404, 406, and 408, is a depiction of text. In an illustrative embodiment of the invention, the visualizing program will summarize the text. This summary may be done by assessing the frequency of word usage, identifying and using key words or by other methods and embodiments discussed in subsequent paragraphs. In an illustrative embodiment, visualizing program 500 generates the word cloud 508 after every audio word is added to text. In another illustrative embodiment visualizing program 500 might wait until an end point of the segment is identified (block 510) before generating the word cloud (block 508). A person skilled in the art will recognize that the word cloud may also be updated at any interval between marking a starting point of the segment 504 and identifying the end point of the segment 510 and such intervals may even be assigned by an end user.

Visualizing program 500 identifies an end point to the segment (block 510). A person of skill in the art will recognize that identifying the end point may be performed in a variety of ways. An exemplary, non-exhaustive list includes: detecting a change in key words or dominant words in the text; analyzing the audio content for long pauses, occurrence of multiple background conversations—where audio content is detected but at a volume too low or indistinct for conversion to text, key phrases such as "the next speaker," "while we wait," "after a break," and other such phrases, or actual voice commands such as "section break" or other similar or end user identified phrases; a manual section break identifier received through inputs such as a keyboard command entry; and other similar methods.

After identifying the end point 510, blocks 502 through 510 repeat for a second segment (block 512).

Figure 6:
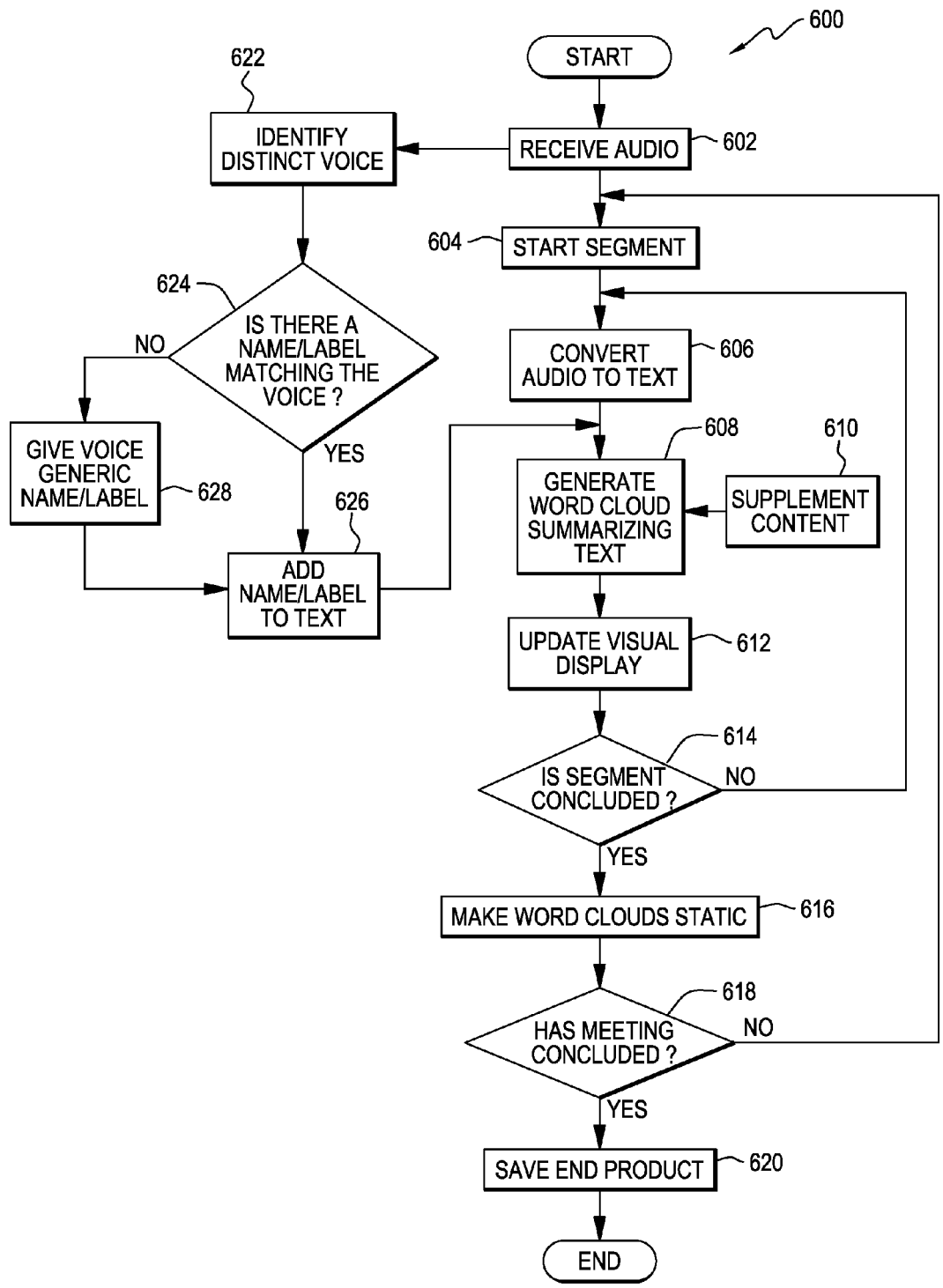
FIG. 6 is a flowchart of a process for generating word clouds wherein information on a distinct speaker may also be used within a word cloud and to distinguish between word clouds depicted in accordance with an illustrative embodiment.

With reference now to FIG. 6, a flowchart of a process for generating word clouds, wherein information on a distinct speaker may be used within the word cloud and to distinguish between word clouds, is depicted in accordance with an illustrative embodiment. Visualizing program 600 represents a second implementation of visualizing program 114 of FIG. 1, and begins by receiving an input of audio content (block 602).

An input of audio content may be received through various inputs, such as microphones, or through a network as described previously.

Visualizing program 600 marks a start point of a segment of the meeting (block 604). The meeting will have at least two segments.

Visualizing program 600 converts the audio content into text (block 606) using speech recognition software.

Meanwhile visualizing program 600 identifies a distinct voice (block 622) associated with the audio content. To identify a particular voice, speaker recognition software (also referred to as voice recognition software), which is known in the art and described previously, may be used. As audio content is converted to text 606, the distinct voice may be associated with the text.

In decision block 624, each time a distinct voice is identified, typically by taking a voice print of the available audio, visualizing program 600 must determine if the voice matches a name or a label for that distinct voice. As previously described, voice recognition algorithms compare a received voice print to stored voice prints. In one embodiment, no database of names or labels associated with a voice print will exist prior to the meeting. In such an embodiment, each distinct voice identified may be given a generic name or label, such as speaker1, speaker2, etc. (block 628) and a voice print may be created and stored for that name or label. Or, in a similar embodiment, callers on a conference call, for example, state their name upon calling in, which may be used to give that distinct voice a name or label as well as a voice print. In another embodiment, a database, e.g. database 116 or 124, of named or labeled voice prints may already exist. In such an embodiment, visualizing program 600 may match distinct voices to names or labels within this database, and it may still create a generic name or label if no match is found.

After a matching name or label has been found 624 or a generic name or label given 628, visualizing program 600 adds the name or label to the text (block 626). In one embodiment each name or label will be associated with each word converted into text. As an illustrative example, if a distinct voice labeled Speaker1 said the word "dominant" three times and "weak" once and a distinct voice labeled Speaker2 said the word "dominant" once, the stored text might look like: "dominant, Speaker1, dominant, Speaker1, weak, Speaker1, dominant, Speaker2, dominant, Speaker1." It would be this text that the word cloud would summarize (see block 508 and block 608). A person of skill in the art will understand that many embodiments of the invention exist that may accomplish this. For example, names or labels may be stored in a different data set than audio content converted to text. Similarly, only one instance of each label or name may be stored, with the label or name having attributes associated with it, one of which might include a frequency category which numerically increases as the distinct voice associated with the name or label is identified as having spoken again.

Visualizing program 600 will generate a word cloud summarizing text (block 608). This may include summarizing in a variety of manners the words spoken, as described above, and also may include, in an illustrative embodiment names or labels of distinct speakers. In one embodiment the name or label associated with each distinct voice may be shown in the word cloud. In a separate embodiment, only one name or label may be included in the word cloud, based on the first distinct voice or in another embodiment a predominant distinct voice. In yet another embodiment, names or labels may be included in the word cloud based upon dominance of a distinct voice. Dominance may be measured by amount of words spoken by the voice as well as prosody measurements as described in the background. These possibilities are merely exemplary and are not intended to limit the invention. The person of skill in the art will recognize that there are many ways in which names or labels may be included or withheld from the word cloud that are within the meaning of this invention.

In addition to audio content text and name or label text, visualizing program 600 may also capture supplemental content 610 and use the supplemental content in generating a summarizing word cloud 608. The term "capture" is used loosely and refers to the obtaining of supplemental content in any number of ways including, but not limited to, manual entry, or reading and storing textual data from any document stored or fed into a computer. Such supplemental content may be any textual data received from a source other than analysis of audio content, and may include a manually entered agenda for the meeting, speaker notes, PowerPoint™ presentations, and other documents that include textual data. Not only may supplemental data be summarized and included in the word cloud, but in certain instances it may even help to summarize the text. In one such example, an agenda of the meeting may be inputted as supplemental content. The summarizing function may use the agenda to identify key words and add extra to weight to such words when spoken.

A person skilled in the art will understand that "text" as used in block 608 may refer to any information regarding audio content (i.e. what was said), any information regarding distinct voices (i.e. who said it), and finally any other documentation used during or related to the meeting.

Visualizing program 600 may present a visual display (block 612). Such a display may provide a visual representation of at least two word clouds associated with at least two segments of the meeting, such as shown in FIG. 4. Detailed discussion of display embodiments may be found in preceding paragraphs. Each word cloud displays in association to a specific segment of the meeting. Identifiers may be placed in the data to designate the association of a word cloud with the segment it was generated from.

In an illustrative embodiment of updating a visual display 612, the display device may be updated with the word cloud representation as it is being created as shown in FIG. 6. Such an update may happen after every word, and may also update at various time intervals such as at the end of each segment, or even at the end of the meeting. In another embodiment an end user may input a refresh rate for the visual display. In such an instance where the visual display updates (612) at least once within a segment, up to and including visual display updating (612) after every word (where it is a dynamic display), the process may restrict such updating on a word cloud in response to identifying an end point to the segment (decision block 614) the word cloud represents (display would become static) (block 616). In essence, in an illustrative embodiment of the invention, a dynamic display of a word cloud becomes static when the word cloud is complete. A new word cloud begins dynamic display in association with a new segment of the meeting.

Visualizing program 600 determines if the segment of the meeting has concluded (decision block 614). Discussed earlier were a number of embodiments in which the invention might identify an ending point to the segment. The previously discussed embodiments functioned generally off of the content of the words said and a manual entering of a break point. In addition to those and similar embodiments other methods covered by this invention for determining the ending point for a given segment include: a change in speaker or predominant speaker as identified by voice recognition software; a change in a set of dominant speakers—prosody measurements may be used in such a determination; by matching spoken words to words in a trackable agenda, PowerPoint™ slide, or other documentation inputted as supplemental content and determining when the spoken words relate to a different topic or subject within the supplemental content; analyzing presented material, such as a PowerPoint™ slide, for a specific break command or significant key word changes in slide titles; and allowing an end user to take a completed visual representation and insert or remove breaks. In an embodiment where the end user can input or alter end points, the word clouds associated with each segment would rearrange themselves accordingly. Any embodiment described may be used alone or in conjunction with another embodiment. The end visualization must continue to have a plurality of segments. The list is merely exemplary and does not attempt to list all potential embodiments.

If process 600 determines that the segment has not concluded 614, it will repeat the preceding steps, expanding the representative word cloud, until an ending point is identified, and the segment is determined to have concluded.

If process 600 determines that the segment has concluded 614, the current word cloud may be set to a static display (616) as described above.

Process 600 determines if the entire meeting is concluded (block 618). The end of the meeting may be identified by prolonged silence, key words, analysis of supplemental documentation, manual end, or other such measures. If the meeting has not concluded, process 600 will start a new segment 604.

If the meeting is concluded (block 618), process 600 may store any information, data, visual representation or other byproduct of the invention in any tangible storage device (block 620). In another embodiment, an end user may access stored information for further review and/or editing.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block diagrams and flowcharts may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for visualizing content of a meeting having a plurality of segments, the method comprising:
    a computer receiving audio content and supplemental content;
    for each segment of the plurality of segments of the meeting:
        the computer marking a starting point of the segment;
        the computer converting the audio content into text with speech recognition software;
        the computer generating a word cloud summarizing the text from the segment;
        the computer including in the word cloud one or more text words from the supplemental content; and
        the computer identifying an ending point of the segment.

2. The method of claim 1, further comprising:
    the computer associating a first portion of the text to a distinct person; and
    the computer identifying the distinct person in the word cloud.

3. The method of claim 1 wherein the supplemental content consists of at least one of:
    an agenda related to the audio content, speaker notes, and presentation material related to the audio content.

4. A computer program product for visualizing content of a meeting having a plurality of segments, the computer program product comprising:
    one or more computer-readable tangible storage devices and program instructions stored on at least one of the one or more storage devices, the program instructions comprising:
    program instructions to receive audio content and supplemental content;
    for each segment of the plurality of segments of the meeting:
        program instructions to mark a starting point of the segment;
        program instructions to convert the audio content into text with speech recognition software;
        program instructions to generate a word cloud summarizing the text from the segment;
        program instructions to include in the word cloud one or more text words from the supplemental content; and
        program instructions to identify an ending point of the segment.

5. The computer program product of claim 4 further comprising program instructions, stored on at least one of the one or more storage devices, to:
    associate a first portion of the text to a distinct person; and
    identify the distinct person in the word cloud.

6. The computer program product of claim 4 wherein the supplemental content consists of at least one of:
    an agenda related to the audio content, speaker notes, and presentation material related to the audio content.

7. A computer system for visualizing content of a meeting having a plurality of segments, the computer system comprising:
    one or more processors, one or more computer-readable memories, one or more computer-readable tangible storage devices and program instructions which are stored on the one or more storage devices for execution by the one or more processors via the one or more memories, the program instructions comprising:
    program instructions to receive audio content and supplemental content;
    for each segment of the plurality of segments of the meeting:
        program instructions to mark a starting point of the segment;
        program instructions to convert the audio content into text with speech recognition software;
        program instructions to generate a word cloud summarizing the text from the segment;
        program instructions to include in the word cloud one or more text words from the supplemental content; and
        program instructions to identify an ending point of the segment.

8. The computer system of claim 7 further comprising:
program instructions, stored on at least one of the one or more storage devices for execution by at least one of the one or more processors via at least one of the one or more memories, to:
associate a first portion of the text to a distinct person; and
identify the distinct person in the word cloud.

9. The computer system of claim 7 wherein the supplemental content consists of at least one of: an agenda related to the audio content, speaker notes, and presentation material related to the audio content.

10. The method of claim 1 further comprising:
the computer displaying a first word cloud in association with a visual depiction of a first segment of the plurality of segments on a displayed timeline of the audio content; and
the computer displaying a second word cloud in association with a visual depiction of a second segment of the plurality of segments on the displayed time line of the audio content.

11. The method of claim 1, wherein identifying the ending point of the segment comprises:
determining a change in subject has occurred based on dominant words from the audio content.

12. The method of claim 1, wherein identifying the ending point of the segment comprises:
out of a plurality of distinct speakers contributing to the audio content, determining a change in a predominant speaker within the audio content.

13. The computer program product of claim 4 further comprising program instructions, stored on at least one of the one or more storage devices, to:
display a first word cloud in association with a visual depiction of a first segment of the plurality of segments on a displayed timeline of the audio content; and
display a second word cloud in association with a visual depiction of a second segment of the plurality of segments on the displayed timeline of the audio content.

14. The computer program product of claim 4, wherein the program instructions to identify an ending point of the segment comprise:
program instructions to determine a change in subject has occurred based on dominant words from the audio content.

15. The computer program product of claim 4, wherein the program instructions to identify the ending point of the segment comprise:
program instructions to determine a change in a predominant speaker within the audio content, out of a plurality of distinct speakers contributing to the audio content.

16. The computer system of claim 7 further comprising:
program instructions, stored on at least one of the one or more storage devices for execution by at least one of the one or more processors via at least one of the one or more memories, to:
display a first word cloud in association with a visual depiction of a first segment of the plurality of segments on a displayed timeline of the audio content; and
display a second word cloud in association with a visual depiction of a second segment of the plurality of segments on the displayed timeline of the audio content.

17. The computer system of claim 7, wherein the program instructions to identify the ending point of the segment comprise:
program instructions to determine a change in subject has occurred based on dominant words from the audio content.

18. The computer system of claim 7, wherein the program instructions to identify the ending point of the segment comprise:
program instructions to determine a change in a predominant speaker within the audio content, out of a plurality of distinct speakers contributing to the audio content.

19. The method of claim 1 further comprising:
the computer displaying a first word cloud associated with a first segment of the plurality of segments;
the computer converting additional audio content from the first segment into additional text words;
the computer updating the displayed first word cloud based on the additional text words;
after identifying an ending point of the first segment the computer displaying a second word cloud associated with a second segment of the plurality of segments;
while the first word cloud remains statically displayed:
the computer converting additional audio content from the second segment into second additional text words; and
the computer updating the displayed second word cloud based on the second additional text words as the additional audio content from the second segment are converted into the second additional text words.

20. The computer program product of claim 4 further comprising, program instructions stored on at least one of the one or more storage devices, to:
display a first word cloud associated with a first segment of the plurality of segments;
convert additional audio content from the first segment into additional text words;
update the displayed first word cloud based on the additional text words;
display a second word cloud associated with a second segment of the plurality of segments after identifying an ending point of the first segment;
while the first word cloud remains statically displayed:
convert additional audio content from the second segment into second additional text words; and
update the displayed second word cloud based on the second additional text words as the additional audio content from the second segment are converted into the second additional text words.

21. The computer system of claim 7 further comprising:
program instructions, stored on at least one of the one or more storage devices for execution by at least one of the one or more processors via at least one of the one or more memories, to:
display a first word cloud associated with a first segment of the plurality of segments;
convert additional audio content from the first segment into additional text words;
update the displayed first word cloud based on the additional text words;
display a second word cloud associated with a second segment of the plurality of segments after identifying an ending point of the first segment;
while the first word cloud remains statically displayed:
convert additional audio content from the second segment into second additional text words; and
update the displayed second word cloud based on the second additional text words as the additional audio content from the second segment are converted into the second additional text words.

* * * * *